US012605228B2

(12) United States Patent
Tanaka

(10) Patent No.: US 12,605,228 B2
(45) Date of Patent: Apr. 21, 2026

(54) DENTAL HANDPIECE

(71) Applicant: J. MORITA MFG. CORP., Kyoto (JP)

(72) Inventor: Hitoshi Tanaka, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 373 days.

(21) Appl. No.: 18/337,925

(22) Filed: Jun. 20, 2023

(65) Prior Publication Data

US 2023/0414319 A1 Dec. 28, 2023

(30) Foreign Application Priority Data

Jun. 23, 2022 (JP) ................................. 2022-101056

(51) Int. Cl.
*A61C 1/14* (2006.01)
*A61C 1/12* (2006.01)
(52) U.S. Cl.
CPC ................ *A61C 1/145* (2013.01); *A61C 1/12* (2013.01)
(58) Field of Classification Search
CPC .. A61C 1/14; A61C 1/12; A61C 1/141; A61C 1/10; A61L 7/162; A61B 17/162
See application file for complete search history.

(56) References Cited

U.S. PATENT DOCUMENTS 4,370,132 A * 1/1983 Wohlgemuth ........ B23B 31/113
433/128
5,011,408 A 4/1991 Nakanishi 5,704,786 A * 1/1998 Quinn .................... A61C 1/144
433/128
6,190,168 B1 2/2001 Bowen
9,347,319 B2 * 5/2016 Lai ........................... A61C 1/05
2007/0065774 A1 * 3/2007 Pernot ..................... A61C 1/12
433/133

(Continued)

FOREIGN PATENT DOCUMENTS

EP 0 322 896 A2 7/1989
JP 10-211215 A 8/1998

(Continued)

OTHER PUBLICATIONS

Office Action issued Jun. 11, 2024, in corresponding Japanese Patent Application No. 2022-101056 (with English Translation), 5 pages.

(Continued)

*Primary Examiner* — Heidi M Eide
(74) *Attorney, Agent, or Firm* — Oblon, McClelland, Maier & Neustadt, L.L.P.

(57) ABSTRACT

A dental handpiece includes a main body portion, a holding portion, and a releasing mechanism. The releasing mechanism includes a cap, a cap ring, and a push cap. The cap includes an outer annular portion and an inner annular portion provided with at least one window portion. The push cap is configured to be movable to a releasing position between the outer annular portion and the inner annular portion in a direction in which the push cap is put on the cap ring, the releasing position being a position at which the holding portion is released. The cap ring includes at least one claw portion anchored to the at least one window portion from the inner side. The at least one claw portion is disposed on the inner side with respect to the inner annular portion.

19 Claims, 9 Drawing Sheets

(56) References Cited

U.S. PATENT DOCUMENTS

| 2009/0142730 | A1 * | 6/2009 | Pernot | A61C 1/144 |
| | | | | 433/128 |
| 2019/0015176 | A1 * | 1/2019 | Juillerat | A61C 1/142 |
| 2022/0079710 | A1 | 3/2022 | Ertugrul et al. | |

FOREIGN PATENT DOCUMENTS

| JP | 2003-325549 | A | | 11/2003 |
| JP | 2013-212 | A | | 1/2013 |
| JP | 2014113301 | A | * | 6/2014 |
| JP | 2019-18013 | A | | 2/2019 |
| JP | 2022-510794 | A | | 1/2022 |

OTHER PUBLICATIONS

Extended European Search Report issued on Oct. 27, 2023 in European Patent Application No. 23180930.2, 8 pages.

* cited by examiner

DENTAL HANDPIECE

CROSS REFERENCE TO RELATED APPLICATIONS

This nonprovisional application is based on Japanese Patent Application No. 2022-101056 filed on Jun. 23, 2022 with the Japan Patent Office, the entire contents of which are hereby incorporated by reference.

BACKGROUND

Field of the Disclosure

The present disclosure relates to a dental handpiece.

Description of the Background Art

A dental handpiece rotates a cutting tool attached to the dental handpiece at a high speed. The dental handpiece is configured such that the cutting tool is attachable thereto and detachable therefrom.

A dental handpiece to and from which a cutting tool is attachable and detachable is described in, for example, Japanese Patent Laying-Open No. 2003-325549. In the dental handpiece described in this publication, when attaching or detaching the cutting tool, a push button is pushed downward against biasing force of a spring to move a tubular ring downward, with the result that a tubular spring 25 is compressed to maintain a chuck at a releasing position. In this state, the cutting tool can be attached or detached.

When a head height of the dental handpiece is high, the dental handpiece is highly likely to be unintentionally brought into contact with an oral mucosa or the like during treatment. Therefore, the head height of the dental handpiece can be low.

However, in the dental handpiece described in the above publication, a skirt portion of a supporting ring is disposed to overlap with a peripheral wall of the push button in an upward/downward direction. Accordingly, the head height of the dental handpiece is increased by the height of the skirt portion of the supporting ring.

SUMMARY

The present disclosure has been made in view of the above-described problem, and has an object to provide a dental handpiece to attain a low head height of the dental handpiece.

A dental handpiece of the present disclosure is a dental handpiece configured to detachably hold a cutting tool. The dental handpiece includes: a main body portion; a holding portion accommodated in the main body portion and configured to detachably hold the cutting tool; and a releasing mechanism configured to release the holding portion. The releasing mechanism includes a cap attached to the main body portion, a cap ring fixed to the cap, and a push cap put on the cap ring. The cap includes an outer annular portion and an inner annular portion, the inner annular portion being disposed on an inner side with respect to the outer annular portion, the inner annular portion being provided with at least one window portion. The push cap is configured to be movable to a releasing position between the outer annular portion and the inner annular portion in a direction in which the push cap is put on the cap ring, the releasing position being a position at which the holding portion is released. The cap ring includes at least one claw portion anchored to the window portion from the inner side. The claw portion is disposed on the inner side with respect to the inner annular portion.

The foregoing and other objects, features, aspects and advantages of the present disclosure will become more apparent from the following detailed description of the present disclosure when taken in conjunction with the accompanying drawings.

DETAILED DESCRIPTION OF

Hereinafter, embodiments of the present disclosure will be described with reference to figures.

First, a configuration of a dental handpiece according to an embodiment of the present disclosure will be described.

Figure 1:
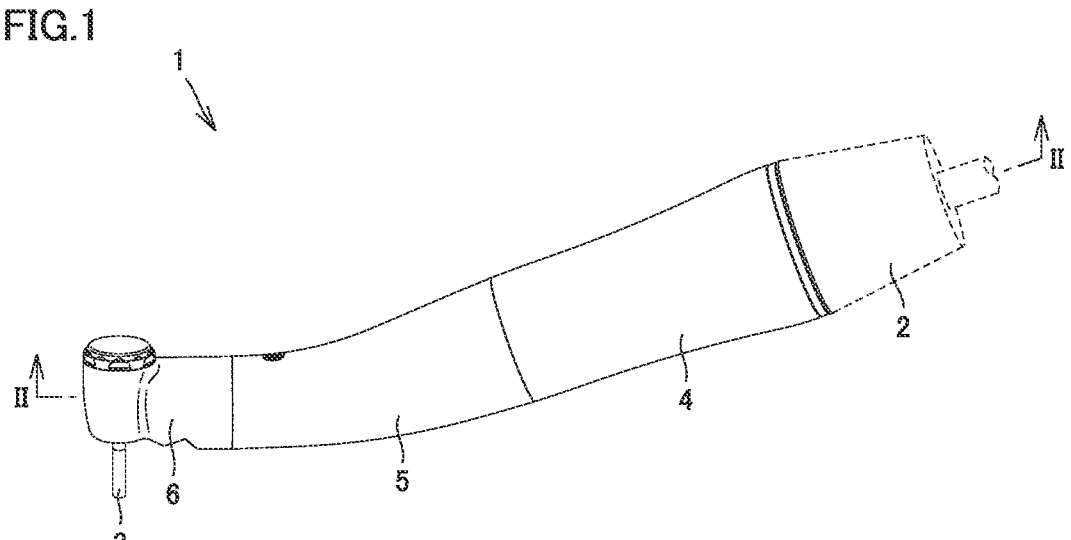
FIG. 1 is a perspective view schematically showing a dental handpiece according to an embodiment.

Referring to FIG. 1, a dental handpiece 1 is configured to detachably hold a cutting tool 3. Dental handpiece 1 is configured to hold cutting tool 3 configured to cut a tooth, and rotate cutting tool 3 at high speed. In the present embodiment, dental handpiece 1 is a motor handpiece configured to rotate cutting tool 3 at high speed by a motor. More specifically, dental handpiece 1 is a contra-angle type handpiece. It should be noted that dental handpiece 1 may be an air turbine handpiece configured to rotate cutting tool 3 at high speed by an air turbine.

A driving portion 2 is connected to one end side (proximal end side) of dental handpiece 1 in the longitudinal direction thereof. Driving portion 2 is attachable to and detachable from the proximal end side of dental handpiece 1. Driving portion 2 includes a motor configured to drive for rotation. Cutting tool 3 is held on the other end side (distal end side) of dental handpiece 1 in the longitudinal direction. Cutting tool 3 is configured to be rotated to cut a tooth.

Dental handpiece 1 includes a body portion 4, a neck portion 5 and a head portion 6. Body portion 4, neck portion 5, and head portion 6 are arranged in this order from the proximal end side to the distal end side of dental handpiece 1 in the longitudinal direction.

Body portion 4 is attachable to and detachable from driving portion 2. Body portion 4 is disposed on the proximal end side of dental handpiece 1. The diameter of body portion 4 is gradually decreased toward the distal end side of dental handpiece 1.

Body portion 4 includes a housing having a substantially cylindrical shape. Body portion 4 is a grip portion to be held by a user, such as a practitioner and a maintenance operator.

When the user holds dental handpiece 1 such that cutting tool 3 faces downward and head portion 6 faces upward with body portion 4 being horizontal, neck portion 5 is curved upward at the center portion in the longitudinal direction and is gradually decreased in diameter toward the distal end side. Neck portion 5 includes a housing having a substantially cylindrical shape.

Head portion 6 is connected to body portion 4 via neck portion 5. Head portion 6 includes a housing having a substantially cylindrical shape and having an axial direction (upward/downward direction in FIG. 1) that is substantially orthogonal to the longitudinal direction of neck portion 5.

Figure 2:
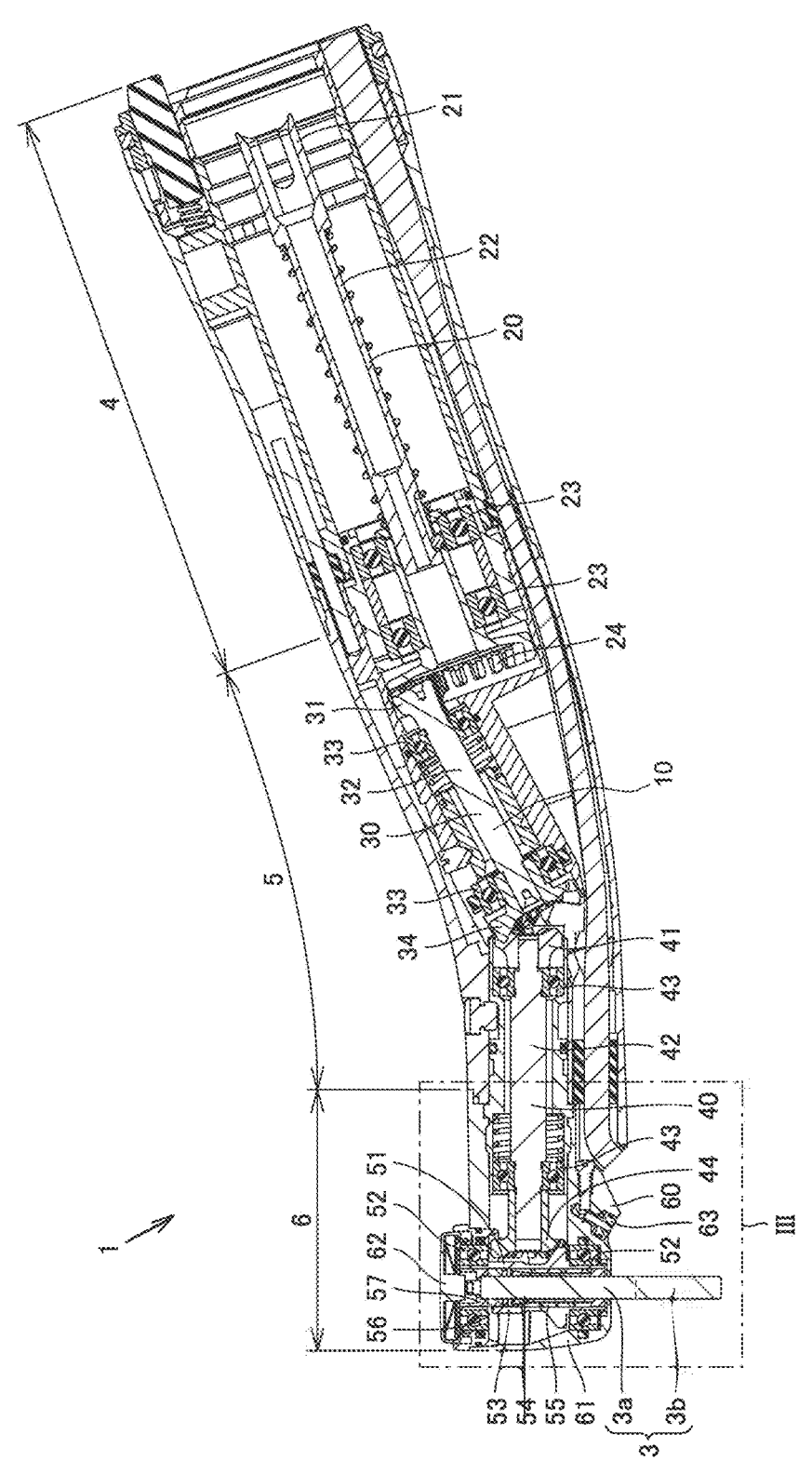
FIG. 2 is a cross sectional view taken along a line II-II of FIG. 1.

Referring to FIGS. 1 and 2, dental handpiece 1 is configured to rotate cutting tool 3 at high speed by increasing the speed of the rotation of the motor of driving portion 2 by a rotation transmission mechanism 10. Rotation transmission mechanism 10 is accommodated in a housing of each of body portion 4, neck portion 5, and head portion 6.

Rotation transmission mechanism 10 includes a first transmission mechanism 20, a second transmission mechanism 30, a third transmission mechanism 40, and a tool rotation mechanism 50. First transmission mechanism 20, second transmission mechanism 30, third transmission mechanism 40, and tool rotation mechanism 50 are arranged in this order from the proximal end side to the distal end side of dental handpiece 1 in the longitudinal direction.

First transmission mechanism 20 is disposed inside the housings of body portion 4 and neck portion 5. Second transmission mechanism 30 is disposed inside the housing of neck portion 5. Third transmission mechanism 40 is disposed inside the housings of neck portion 5 and head portion 6. Tool rotation mechanism 50 is disposed inside the housing of head portion 6.

First transmission mechanism 20 is configured to transmit the rotation of the motor of driving portion 2 to the second transmission mechanism 30. First transmission mechanism 20 includes a motor-coupled portion 21, a first rotation shaft 22, two first bearing portions 23, and a drive gear 24. Motor-coupled portion 21 is configured to be coupled to a shaft portion of the motor of driving portion 2. Motor-coupled portion 21 is connected to the proximal end side of first rotation shaft 22. First rotation shaft 22 is a hollow, substantially cylindrical body. First rotation shaft 22 is held by two first bearing portions 23 so as to be rotatable around a rotation axis extending in the axial direction. Two first bearing portions 23 are disposed to be separated from each other in the axial direction of first rotation shaft 22. Each of two first bearing portions 23 is a ball bearing. Drive gear 24 is connected to the distal end side of first rotation shaft 22. Drive gear 24 is an internally-toothed gear.

Second transmission mechanism 30 is configured to transmit the rotation of first transmission mechanism 20 to third transmission mechanism 40. Second transmission mechanism 30 includes a pinion gear 31, a second rotation shaft 32, two second bearing portions 33, and a bevel gear 34. Pinion gear 31 is configured to be engaged with drive gear 24. Pinion gear 31 is connected to the proximal end side of second rotation shaft 32. Second rotation shaft 32 is a solid, substantially cylindrical body. Second rotation shaft 32 is held by two second bearing portions 33 so as to be rotatable around a rotation axis extending in the axial direction. Two second bearing portions 33 are disposed to be separated from each other in the axial direction of second rotation shaft 32. Each of two second bearing portions 33 is a ball bearing. Bevel gear 34 is connected to the distal end side of second rotation shaft 32. Bevel gear 34 is an externally-toothed gear.

Third transmission mechanism 40 is configured to transmit the rotation of second transmission mechanism 30 to tool rotation mechanism 50. Third transmission mechanism 40 includes a middle gear 41, a third rotation shaft 42, two third bearing portions 43, and a front gear 44. Middle gear 41 is configured to be engaged with bevel gear 34. Middle gear 41 is connected to the proximal end side of third rotation shaft 42. Third rotation shaft 42 is a solid, substantially cylindrical body. Third rotation shaft 42 is held by two third bearing portions 43 so as to be rotatable around a rotation axis extending in the axial direction. Two third bearing portions 43 are disposed to be separated from each other in the axial direction of third rotation shaft 42. Each of two third bearing portions 43 is a ball bearing. Front gear 44 is connected to the distal end side of third rotation shaft 42. Front gear 44 is an internally-toothed gear.

Tool rotation mechanism 50 is configured to rotate cutting tool 3 by transmitting the rotation of third transmission mechanism 40 to cutting tool 3. Tool rotation mechanism 50 includes a holding portion 51 and two head-portion bearing portions 52.

Holding portion 51 is held by two head-portion bearing portions 52 so as to be rotatable around a rotation axis extending in the axial direction of cutting tool 3. Two head-portion bearing portions 52 are disposed to be separated from each other in the axial direction of holding portion 51. Each of two head-portion bearing portions 52 is a ball bearing.

Cutting tool 3 includes a base stem 3*a* and a cutting edge portion 3*b*. Base stem 3*a* and cutting edge portion 3*b* are formed in one piece. Base stem 3*a* and cutting edge portion 3*b* form a substantially cylindrical shape. Base stem 3*a* is held by holding portion 51 inside head portion 6. Cutting edge portion 3*b* protrudes from base stem 3*a* in the axial direction of base stem 3*a*.

Holding portion 51 has a mechanism configured to detachably hold cutting tool 3. Holding portion 51 includes a rotation cylinder 53, a chuck 54, an elastic body 55, a slide ring 56, and a ring stopper 57.

Chuck 54, elastic body 55, slide ring 56, and ring stopper 57 are inserted in rotation cylinder 53. Chuck 54, elastic body 55, slide ring 56, and ring stopper 57 are accommodated in rotation cylinder 53 in this order from the cutting edge side toward the cutting root side of cutting tool 3.

Rotation cylinder 53 is configured to allow cutting tool 3 to be inserted therein. Rotation cylinder 53 is a head-side gear formed to have a cylindrical shape. Rotation cylinder 53 is a substantially cylindrical body having: an inner diameter that allows for accommodation of chuck 54, elastic body 55, slide ring 56, and ring stopper 57; and an outer diameter that can be fitted to an inner ring of head-portion bearing portion 52.

Rotation cylinder 53 can convert the rotation of third transmission mechanism around the axis along the longitudinal direction of neck portion 5 into the rotation of tool rotation mechanism 50 around the axis along the longitudinal direction of cutting tool 3.

Rotation cylinder 53 includes a stem main body 53*a*, which is a substantially cylindrical body, and rotor gear teeth 53*b*. Rotor gear teeth 53*b* are a bevel gear. Stem main body 53*a* is a substantially cylindrical body. Rotor gear teeth 53*b* protrude radially outward from an outer peripheral surface of stem main body 53*a*, and, when viewed in a cross sectional view, a surface thereof on the cutting edge side is inclined downward in a direction toward the radially outward side. The plurality of rotor gear teeth 53*b* are provided at equal intervals along the outer periphery of stem main body 53*a*. Rotation cylinder 53 provided with the plurality of rotor gear teeth 53*b* is a bevel gear and is a driven gear engaged with front gear 44 of third transmission mechanism 40.

Chuck 54 is configured to attach and detach cutting tool 3 inserted in rotation cylinder 53. Chuck 54 is disposed on the cutting edge side (lower side) with respect to the substantial center of cutting tool 3 in the longitudinal direction inside rotation cylinder 53. Chuck 54 is configured to hold base stem 3*a* of cutting tool 3 inserted along the longitudinal direction of cutting tool 3.

Elastic body 55 is configured to bias chuck 54 to engage chuck 54 with cutting tool 3. Elastic body 55 is a compressive elastic body deformable in a compression direction, and is externally fitted to an upper portion of chuck 54 inside rotation cylinder 53.

Slide ring 56 is configured to be movable in the axial direction inside rotation cylinder 53. Slide ring 56 is accommodated on the cutting root side of cutting tool 3 with respect to elastic body 55, and is configured to push elastic body 55.

In holding portion 51, elastic body 55 before being compressively deformed pushes an end portion of chuck 54 on the cutting root side, and chuck 54 having been decreased in diameter by the pushing of elastic body 55 can hold cutting tool 3. On the other hand, when elastic body 55 is compressively deformed, cutting tool 3 held by chuck 54 can be released.

Ring stopper 57 is formed to have a substantially ring-like shape, and is externally fitted to a portion of slide ring 56 on the cutting root side. Ring stopper 57 can regulate a position of cutting tool 3 when cutting tool 3 is attached.

Each of two head-portion bearing portions 52 is formed to have a substantially ring-like shape. Two head-portion bearing portions 52 rotatably support the cutting edge side end portion and cutting root side end portion of holding portion 51 inside head portion 6.

Head portion 6 includes a stem portion 60, a housing main body portion 61 and a push cap 62. Stem portion 60 is connected to the distal end side of neck portion 5. Housing main body portion 61 is a hollow, substantially cylindrical body extending along the longitudinal direction of cutting tool 3 attached thereto. Tool rotation mechanism 50, which is configured to be driven to rotate cutting tool 3 held inside housing main body portion 61, is accommodated therein. The upper and lower ends of housing main body portion 61 are opened, and push cap 62 is disposed at the upper end portion of housing main body portion 61. Push cap 62 is provided for the sake of an operation of attaching and detaching cutting tool 3 to and from head portion 6.

Figure 3:
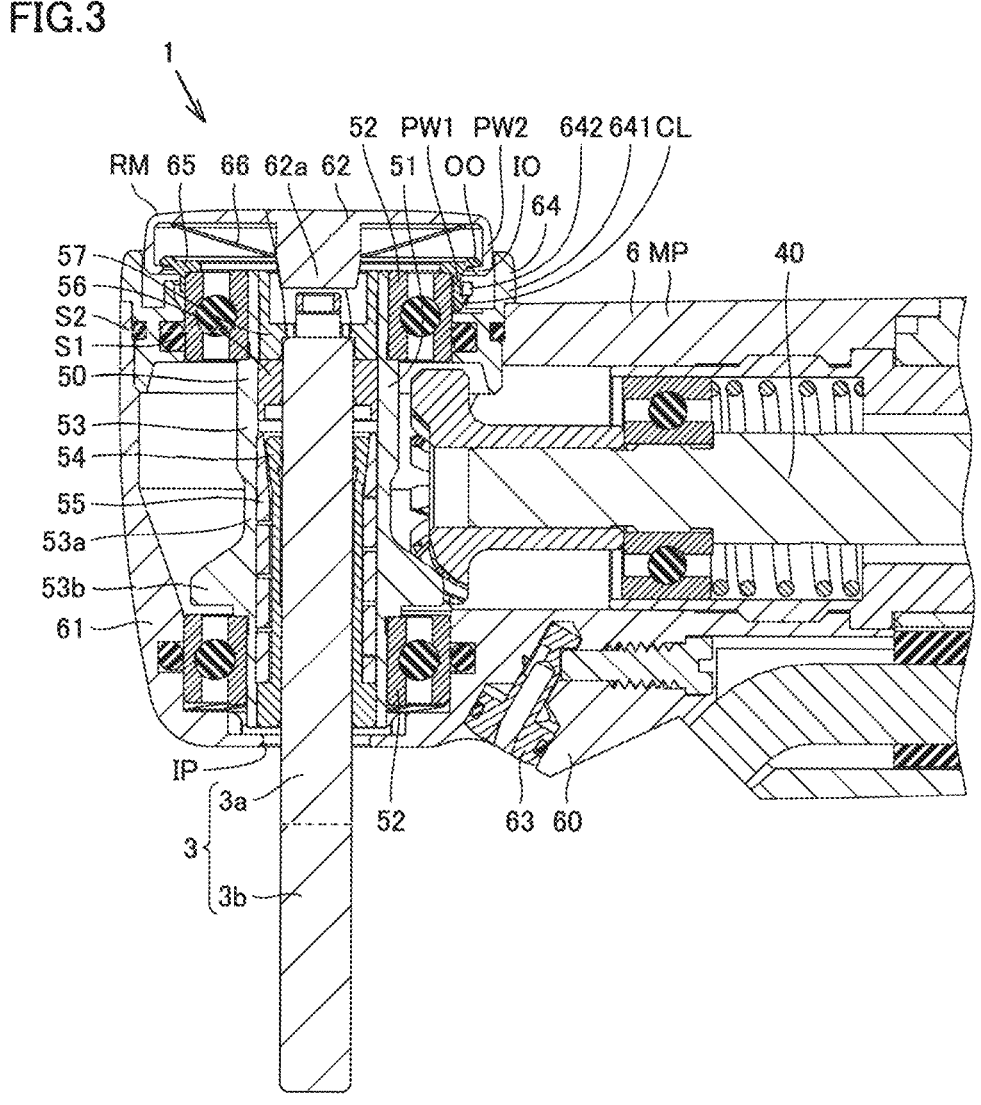
FIG. 3 is an enlarged cross sectional view showing a portion III in FIG. 2.
Figure 4:
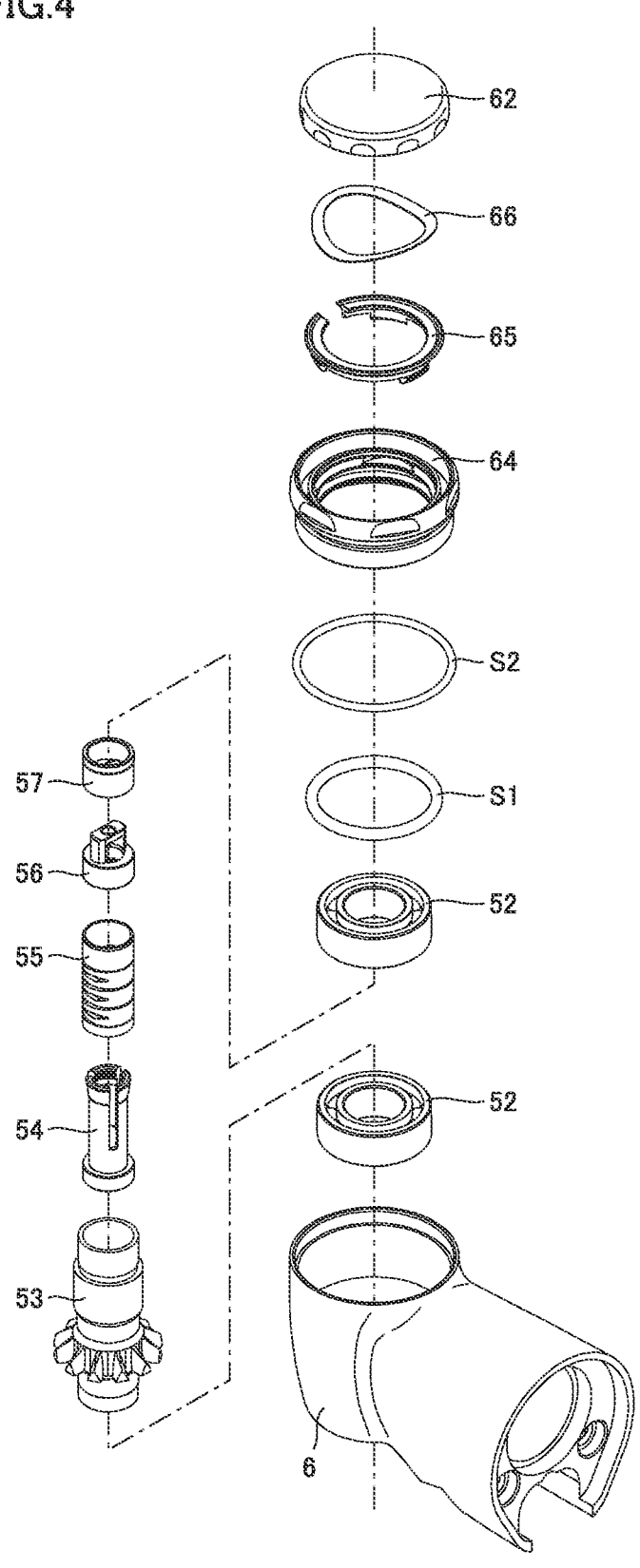
FIG. 4 is an exploded perspective view schematically showing a head portion of the dental handpiece according to the embodiment.

Referring to FIGS. 3 and 4, holding portion 51 is provided with an insertion port IP into which cutting tool 3 can be inserted. Holding portion 51 is configured to detachably hold cutting tool 3. Head portion 6 includes a spraying portion 63. Dental handpiece 1 includes a main body portion MP. In the present embodiment, stem portion 60, housing main body portion 61 and spraying portion 63 constitute main body portion MP. Holding portion 51 is accommodated in main body portion MP. Spraying portion 63 is provided with a water introduction hole and a plurality of chip air holes. One-point water introduction is employed with which only one water introduction hole is provided. Spraying portion 63 is attached to stem portion 60.

Dental handpiece 1 includes a releasing mechanism RM. Releasing mechanism RM is configured to release holding portion 51. Releasing mechanism RM includes a cap 64, a cap ring 65, and push cap 62. In the present embodiment, releasing mechanism RM includes a cap spring 66. Cap 64 is attached to main body portion MP. Cap ring 65 is fixed to cap 64. Push cap 62 is put on cap ring 65. Cap spring 66 is anchored to push cap 62 and cap ring 65. Cap spring 66 is configured to bias push cap 62. Cap spring 66 is a wave washer.

Figure 5:
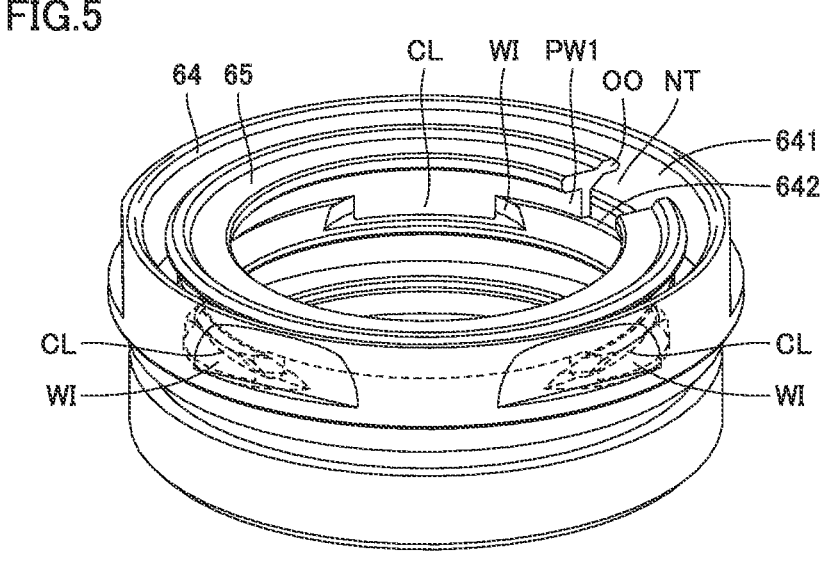
FIG. 5 is a perspective view schematically showing a cap and a cap ring of the dental handpiece according to the embodiment.
Figure 6:
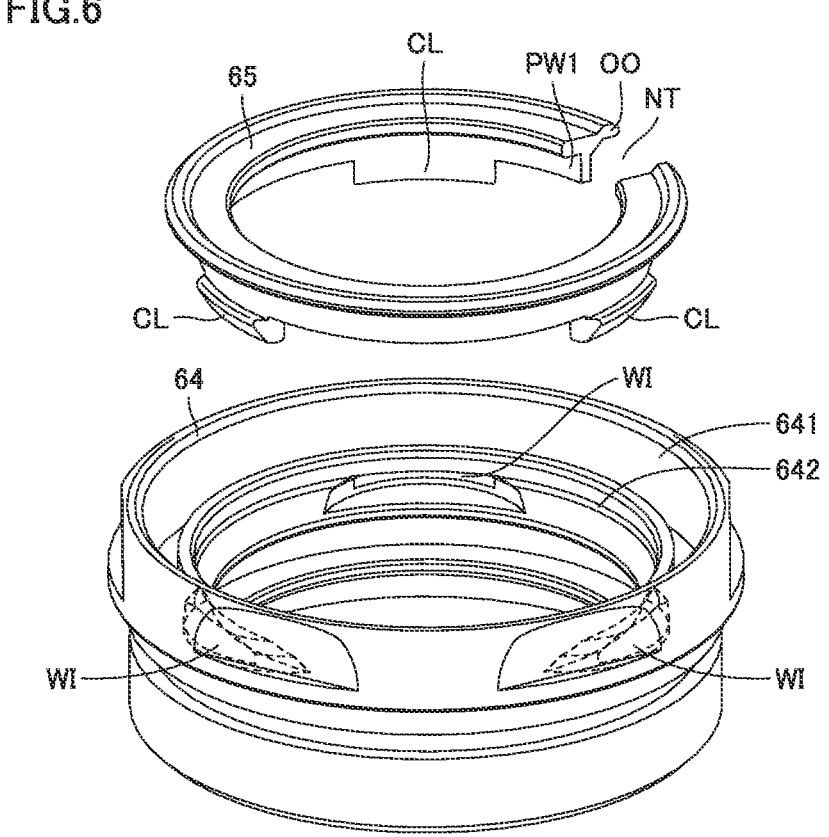
FIG. 6 is an exploded perspective view schematically showing the cap and the cap ring of the dental handpiece according to the embodiment.

Referring to FIGS. 5 and 6, cap 64 includes an outer annular portion 641 and an inner annular portion 642. Each of outer annular portion 641 and inner annular portion 642 extends annularly in the peripheral direction of cap 64. Inner annular portion 642 is disposed on the inner side with respect to outer annular portion 641. Inner annular portion 642 is disposed with a space being interposed between inner annular portion 642 and outer annular portion 641. Inner annular portion 642 is provided with at least one window portion WI. In the present embodiment, inner annular portion 642 is provided with three window portions WI. Window portions WI are provided at portions of inner annular portion 642, rather than the entire periphery of inner annular portion 642. Each of window portions WI is configured to receive a claw portion CL.

Cap ring 65 includes at least one claw portion CL anchored to window portion WI from the inner side. Claw portion CL is configured to be anchored to window portion WI. Claw portion CL is configured to protrude outward. In the present embodiment, cap ring 65 includes three claw portions CL. Cap ring 65 is provided with a notch NT. One end and the other end of cap ring 65 in the peripheral direction are separated from each other by notch NT. Cap ring 65 has a substantially C-shaped form. Since notch NT is provided, cap ring 65 is likely to be deformed inward when a force is applied from the outer side toward the inner side in the radial direction. Thus, cap ring 65 can be readily attached to cap 64 to anchor claw portions CL to window portions WI.

Referring to FIGS. 3 and 5, each of claw portions CL is disposed on the inner side with respect to inner annular portion 642. That is, claw portion CL does not protrude outward with respect to the outer peripheral surface of inner annular portion 642. Claw portion CL is disposed frontward with respect to a rear-side end surface of adjacent head-portion bearing portion 52. Claw portion CL is configured to be disposed rearward with respect to the lower end of push cap 62 when push cap 62 is pushed.

Figure 7:
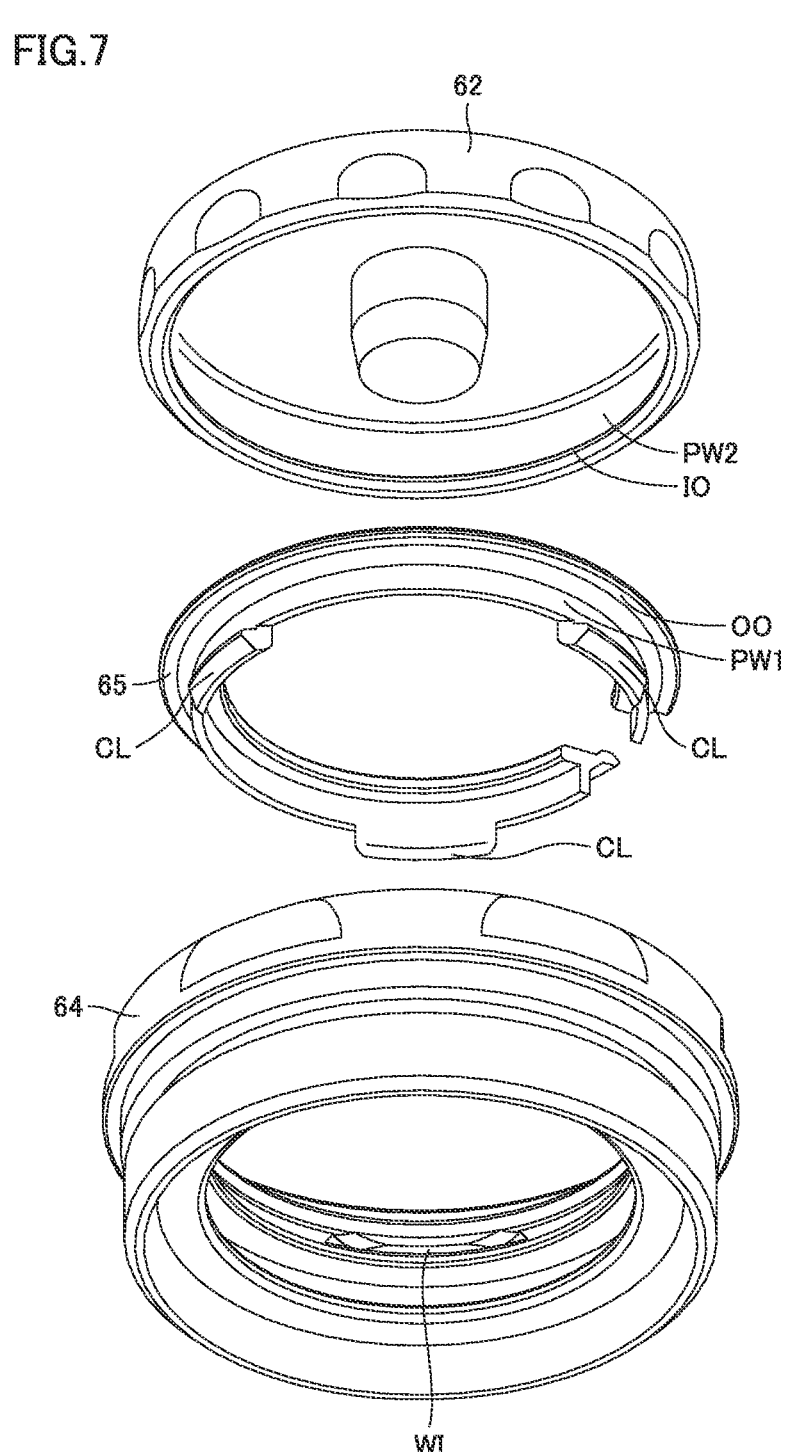
FIG. 7 is an exploded perspective view schematically showing the cap, the cap ring, and a push cap of the dental handpiece according to the embodiment.

Referring to FIGS. 3 and 7, push cap 62 is configured to be movable to a releasing position between outer annular portion 641 and inner annular portion 642 in a direction in which push cap 62 is put on cap ring 65, the releasing position being a position at which holding portion 51 is released. The releasing position of push cap 62 is a position at which the engagement between holding portion 51 and cutting tool 3 is released.

Cap ring 65 includes a first peripheral wall portion PW1 and an outer protruding portion OO. First peripheral wall portion PW1 extends in the peripheral direction of cap ring 65. Outer protruding portion OO protrudes outward from first peripheral wall portion PW1. Outer protruding portion OO extends in the peripheral direction of cap ring 65.

Push cap 62 includes a second peripheral wall portion PW2 and an inner protruding portion IO. Second peripheral wall portion PW2 extends in the peripheral direction of push cap 62. Inner protruding portion IO protrudes inward from second peripheral wall portion PW2. Inner protruding portion IO extends in the peripheral direction of push cap 62. Inner protruding portion IO is configured to be anchored to outer protruding portion OO. Inner protruding portion IO is disposed so as not to overlap with claw portion CL in the direction in which push cap 62 is put on cap ring 65. Inner protruding portion IO is disposed on the outer side with respect to claw portion CL when viewed in a plan view.

Figure 8:
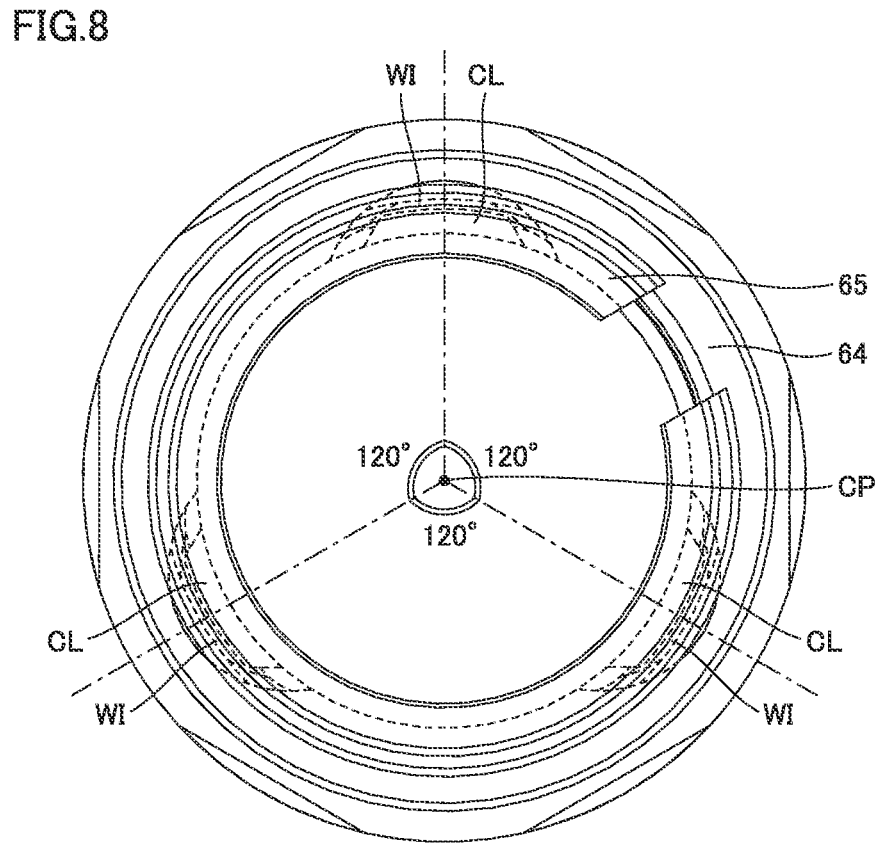
FIG. 8 is a plan view schematically showing the cap and the cap ring of the dental handpiece according to the embodiment.

Referring to FIG. 8, three window portions WI are provided. Three window portions WI are disposed to be separated from one another by 120° when viewed in the direction in which push cap 62 is put on cap ring 65. In other words, three window portions WI are arranged to be separated from one another by 120° in the peripheral direction with respect to center point CP of cap ring 65. More specifically, the centers of three window portions WI in the peripheral direction are disposed to be separated from one another by 120° in the peripheral direction with respect to center point CP.

The three claw portions are provided. Three claw portions CL are arranged to be separated from one another by 120° when viewed in the direction in which push cap 62 is put on cap ring 65. In other words, three claw portions CL are arranged to be separated from one another by 120° in the peripheral direction with respect to center point CP of cap ring 65. More specifically, the centers of three claw portions CL in the peripheral direction are arranged to be separated from one another by 120° with respect to center point CP.

Three claw portions CL are anchored with three claw portions SL being inserted in three window portions WI respectively. That is, three claw portions CL are anchored in a state in which one claw portion CL is inserted into each of three window portions WI.

Next, the following describes an operation of attaching and detaching cutting tool 3 of dental handpiece 1 according to the embodiment.

Figure 9:
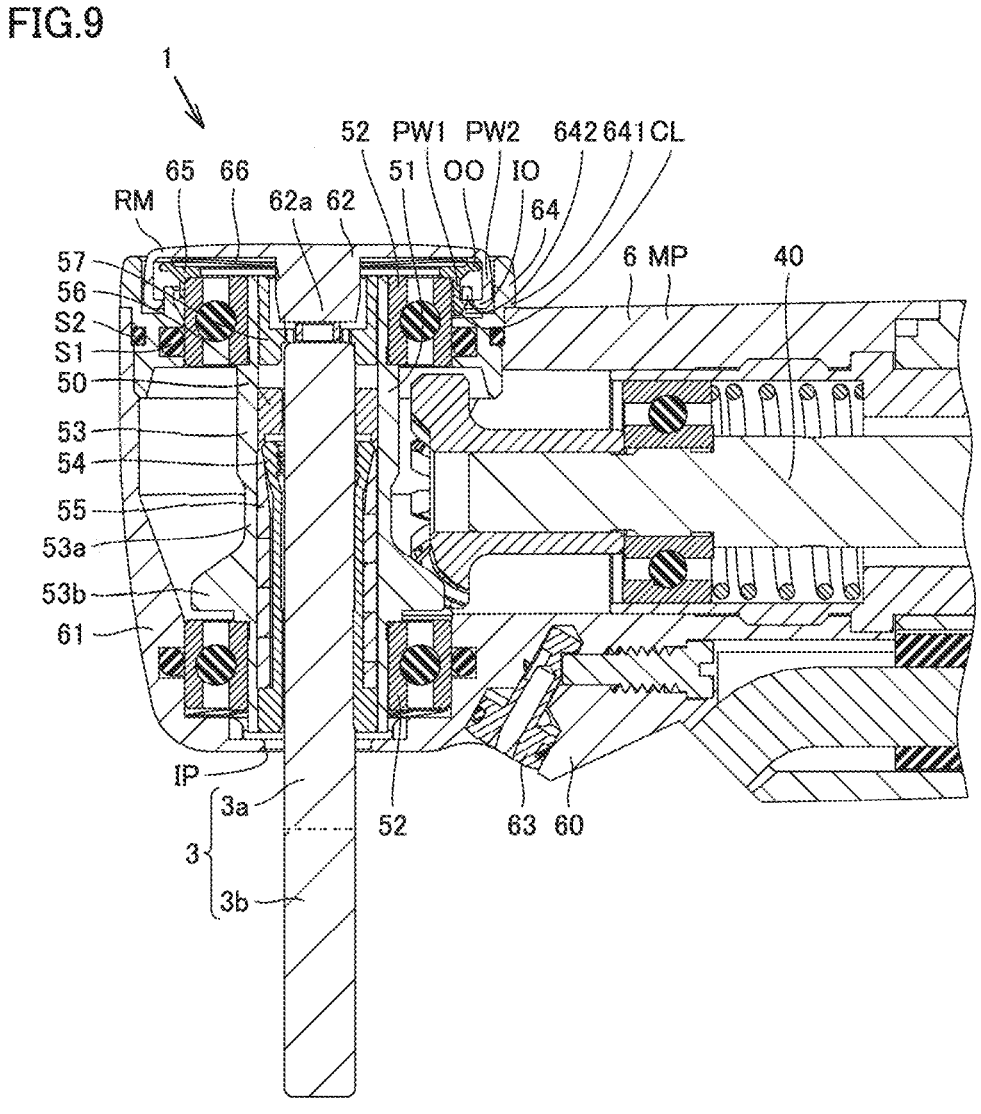
FIG. 9 is a cross sectional view schematically showing a state in which the push cap of the dental handpiece according to the embodiment is pushed downward.

Referring to FIGS. 3 and 9, in a state in which the push cap has been moved to a non-releasing position, inner protruding portion IO is anchored to outer protruding portion OO. In a state in which push cap 62 has been moved to the releasing position, inner protruding portion IO is disposed on the outer side with respect to claw portion CL.

When detaching cutting tool 3, push cap 62 is pushed downward against biasing force of cap spring 66, with the result that a boss portion 62a of push cap 62 is brought into contact with slide ring 56. When push cap 62 is further pushed downward from this state, slide ring 56 is moved downward to push elastic body 55, with the result that elastic body 55 is compressed in the axial direction. As a result, chuck 54 having been biased inward by the biasing force of elastic body 55 is moved outward by elastic restoring force of chuck 54. Thus, the engagement between chuck 54 and cutting tool 3 is released, with the result that cutting tool 3 can be detached.

When attaching cutting tool 3, push cap 62 is pushed downward to move slide ring 56 downward to push elastic body 55, thereby moving chuck 54 outward. In this state, cutting tool 3 is inserted into chuck 54, and then push cap 62 is opened. Thus, slide ring 56 is moved upward and elastic body 55 extends in the axial direction. As a result, chuck 54 is moved inward by biasing force of elastic body 55. Thus, chuck 54 is engaged with the outer peripheral surface of cutting tool 3, thereby holding cutting tool 3.

Next, functions and effects of dental handpiece 1 according to the embodiment will be described.

According to dental handpiece 1 of the embodiment, claw portion CL is disposed on the inner side with respect to inner annular portion 642. Therefore, in the state in which push cap 62 has been moved to the releasing position, claw portion CL does not overlap with inner annular portion 642 in the head height direction.

Therefore, the head height of dental handpiece 1 can be reduced by the height of claw portion CL. In other words, the length of the cap structure portion on the rear side of the head can be short. Therefore, dental handpiece 1 can be downsized.

Further, in dental handpiece 1 according to the embodiment, since the one-point water introduction with which only one water introduction hole is provided is employed, the length of the water introduction structure portion on the front side of the head can be short.

According to dental handpiece 1 of the embodiment, in the state in which push cap 62 has been moved to the releasing position, inner protruding portion IO is disposed on the outer side with respect to claw portion CL. Therefore, in the state in which push cap 62 has been moved to the releasing position, claw portion CL does not overlap with inner protruding portion IO in the head height direction. Therefore, the head height of dental handpiece 1 can be reduced by the height of claw portion CL. Further, a stroke when push cap 62 is moved can be secured.

According to dental handpiece 1 of the embodiment, three window portions WI are arranged to be separated from one another by 120° when viewed in the direction in which push cap 62 is put on cap ring 65. Therefore, forces applied from claw portions CL to window portions WI can be evenly distributed in the peripheral direction. Therefore, strengths of window portions WI can be secured.

According to dental handpiece 1 of the embodiment, three claw portions CL are arranged to be separated from one another by 120° when viewed in the direction in which push cap 62 is put on cap ring 65. Therefore, the forces applied to claw portions CL can be evenly distributed in the peripheral direction. Therefore, strengths of claw portions CL can be secured.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A dental handpiece configured to detachably hold a cutting tool, the dental handpiece comprising:
   a main body portion;
   a holding portion accommodated in the main body portion and configured to detachably hold the cutting tool; and
   a releasing mechanism configured to release the holding portion, wherein
   the releasing mechanism includes a cap attached to the main body portion, a cap ring fixed to the cap, and a push cap put on the cap ring,
   the cap includes an outer annular portion and an inner annular portion, the inner annular portion being disposed on an inner side with respect to the outer annular portion, the inner annular portion being provided with at least one window portion,
   the push cap is configured to be movable to a releasing position between the outer annular portion and the inner annular portion in a direction in which the push cap is put on the cap ring, the releasing position being a position at which the holding portion is released, the cap ring includes at least one claw portion anchored to the at least one window portion from the inner side, and the at least one claw portion is disposed on the inner side with respect to the inner annular portion, wherein the inner annular portion is disposed with a space being interposed between the inner annular portion and the outer annular portion in a radial direction of the outer annular portion and the inner annular portion.

2. The dental handpiece according to claim 1, wherein the cap ring includes a first peripheral wall and an outer protruding portion, the outer protruding portion protruding outward from the first peripheral wall, the push cap includes a second peripheral wall and an inner protruding portion, the inner protruding portion protruding inward from the second peripheral wall, the inner protruding portion being configured to be anchored to the outer protruding portion, and in a state in which the push cap has been moved to the releasing position, the inner protruding portion is disposed on an outer side with respect to the at least one claw portion.

3. The dental handpiece according to claim 1, wherein three window portions are provided as the at least one window portion, and the three window portions are disposed to be separated from one another by 120° when viewed in the direction in which the push cap is put on the cap ring.

4. The dental handpiece according to claim 3, wherein three claw portions are provided as the at least one claw portion, and the three claw portions are disposed to be separated from one another by 120° when viewed in the direction in which the push cap is put on the cap ring.

5. The dental handpiece according to claim 1, wherein the cap ring includes a notch cutout in a peripheral wall of the cap ring.

6. The dental handpiece according to claim 1, wherein the cap ring is a C-shaped ring.

7. A dental handpiece configured to detachably hold a cutting tool, the dental handpiece comprising:

a main body portion;

a holding portion accommodated in the main body portion and configured to detachably hold the cutting tool; and a releasing mechanism configured to release the holding portion, wherein the releasing mechanism includes a cap attached to the main body portion, a cap ring fixed to the cap, a push cap put on the cap ring, and a cap spring anchored between the cap ring and the push cap, the cap includes an outer annular portion and an inner annular portion, the inner annular portion being disposed on an inner side with respect to the outer annular portion, the inner annular portion being provided with at least one window portion, the push cap is configured to be movable to a releasing position between the outer annular portion and the inner annular portion in a direction in which the push cap is put on the cap ring, the releasing position being a position at which the holding portion is released, the cap ring includes at least one claw portion anchored to the at least one window portion from the inner side, and the at least one claw portion is disposed on the inner side with respect to the inner annular portion, wherein the inner annular portion is disposed with a space being interposed between the inner annular portion and the outer annular portion in a radial direction of the outer annular portion and the inner annular portion.

8. The dental handpiece according to claim 7, wherein the cap ring includes a first peripheral wall and an outer protruding portion, the outer protruding portion protruding outward from the first peripheral wall, the push cap includes a second peripheral wall and an inner protruding portion, the inner protruding portion protruding inward from the second peripheral wall, the inner protruding portion being configured to be anchored to the outer protruding portion, and in a state in which the push cap has been moved to the releasing position, the inner protruding portion is disposed on an outer side with respect to the at least one claw portion.

9. The dental handpiece according to claim 7, wherein three window portions are provided as the at least one window portion, and the three window portions are disposed to be separated from one another by 120° when viewed in the direction in which the push cap is put on the cap ring.

10. The dental handpiece according to claim 9, wherein three claw portions are provided as the at least one claw portion, and the three claw portions are disposed to be separated from one another by 120° when viewed in the direction in which the push cap is put on the cap ring.

11. The dental handpiece according to claim 7, wherein the cap spring biases the push cap along the direction in which the push cap is put on the cap ring.

12. The dental handpiece according to claim 7, wherein the cap spring is a wave washer.

13. The dental handpiece according to claim 7, wherein the cap spring is compressed when the push cap is in the releasing position.

14. A dental handpiece configured to detachably hold a cutting tool, the dental handpiece comprising:

a main body portion;

a holding portion accommodated in the main body portion and configured to detachably hold the cutting tool; and a releasing mechanism configured to release the holding portion, wherein the releasing mechanism includes a cap attached to the main body portion, a cap ring fixed to the cap, and a push cap put on the cap ring, the cap includes an outer annular portion and an inner annular portion, the inner annular portion being disposed on an inner side with respect to the outer annular portion, the inner annular portion being provided with at least one window portion, the push cap includes a boss portion extending downwards from a bottom face of the push cap, the push cap is configured to be movable to a releasing position between the outer annular portion and the inner annular portion in a direction in which the push cap is put on the cap ring, the releasing position being a position at which the holding portion is released, the cap ring includes at least one claw portion anchored to the at least one window portion from the inner side, and the at least one claw portion is disposed on the inner side with respect to the inner annular portion, wherein the inner annular portion is disposed with a space being interposed between the inner annular portion and the outer annular portion in a radial direction of the outer annular portion and the inner annular portion.

15. The dental handpiece according to claim 14, wherein the cap ring includes a first peripheral wall and an outer protruding portion, the outer protruding portion protruding outward from the first peripheral wall, the push cap includes a second peripheral wall and an inner protruding portion, the inner protruding portion protruding inward from the second peripheral wall, the inner protruding portion being configured to be anchored to the outer protruding portion, and in a state in which the push cap has been moved to the releasing position, the inner protruding portion is disposed on an outer side with respect to the at least one claw portion.

16. The dental handpiece according to claim 14, wherein three window portions are provided as the at least one window portion, and the three window portions are disposed to be separated from one another by 120° when viewed in the direction in which the push cap is put on the cap ring.

17. The dental handpiece according to claim 16, wherein three claw portions are provided as the at least one claw portion, and the three claw portions are disposed to be separated from one another by 120° when viewed in the direction in which the push cap is put on the cap ring.

18. The dental handpiece according to claim 14, wherein the boss portion is configured to contact the holding portion when the push cap is in the releasing position.

19. The dental handpiece according to claim 14, further comprising a cap spring anchored between the cap ring and the push cap.

\* \* \* \* \*